Sept. 21, 1926.
E. R. MARTIN
ANIMAL TRAP
Filed March 23, 1926
1,600,347
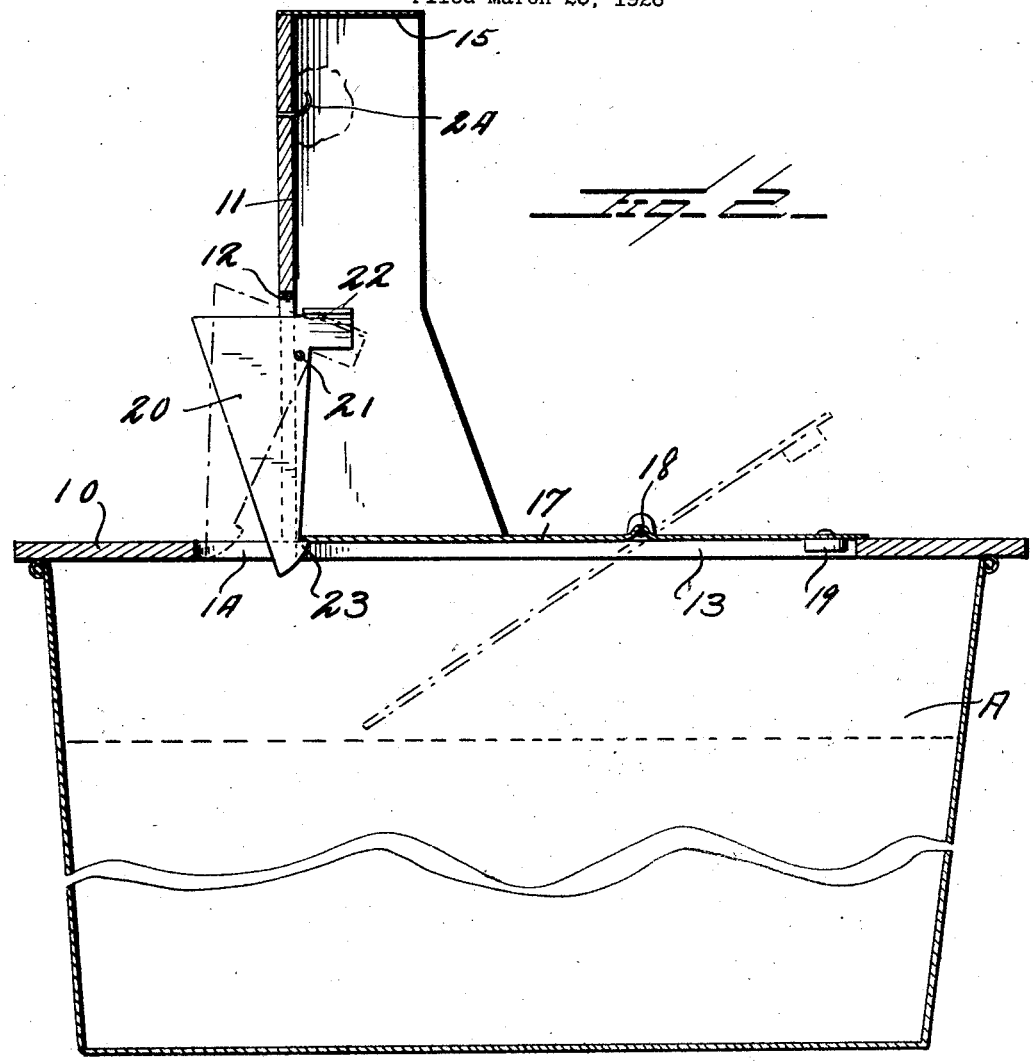
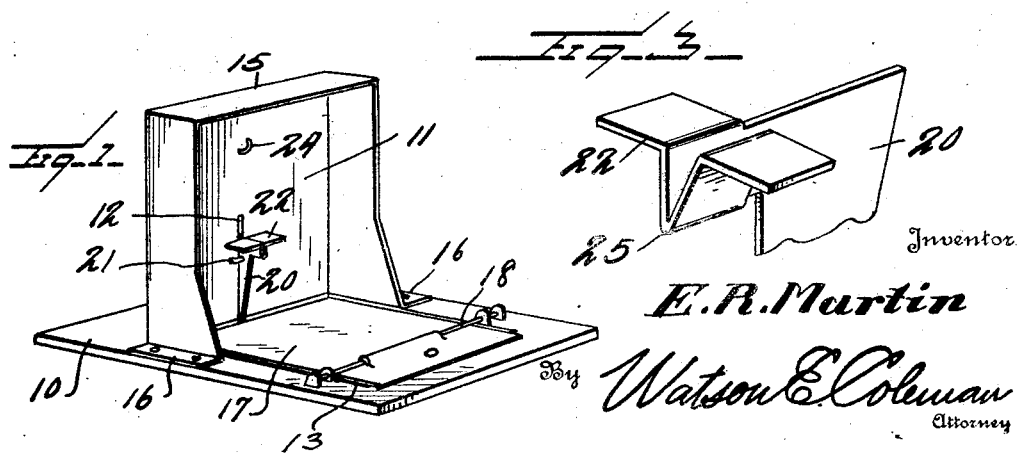

Patented Sept. 21, 1926.

1,600,347

UNITED STATES PATENT OFFICE.

EDWARD R. MARTIN, OF LITTLE ORLEANS, MARYLAND.

ANIMAL TRAP.

Application filed March 23, 1926. Serial No. 96,768.

This invention relates to mouse traps, rat traps, or other traps for small animals and the general object of the invention is to provide a trap which is very simple and which may be supported over a bucket or other vessel filled with water so that the animals, when the trigger of the trap is tripped, will plunge downward into the water and be drowned.

Where traps are used which would discharge the animals in a receptacle not filled with water the animals are very liable to fight, the small animals will be killed and other mice outside the trap, smelling the blood, will get shy and keep away whereas if the animals were drowned, there will be nothing to repulse the animals and keep them away from the trap.

A further object is to provide a trapping device which is very cheaply made, simple, and which is reset after each animal has been caught.

I have illustrated my device as applied to a mouse trap but it is to be understood that it may be made of larger size for trapping rats and made still larger in size for trapping small fur bearing animals.

My invention is illustrated in the accompanying drawings wherein:—

Figure 1 is a perspective view of the trap;

Figure 2 is a vertical section of the trap and water containing vessel;

Figure 3 is a perspective view of the foot rest on the trigger.

Referring to these drawings it will be seen that my trapping device consists of a strip or platform of wood, metal, or other suitable material and designated 10, which is adapted to rest upon a vessel A containing water. Extending upward from this strip 10 is a wall 11 which is vertically slotted at its lower end as at 12. The platform has a rectangular opening 13 in it which extends to the wall 11 and which is continued as a slot 14 beyond this wall 11. Preferably a hood 15 will extend forward from the wall and downward on each side thereof, the lower ends of the sides of this hood being flanged as at 16 and attached to the strip 10.

Tiltably mounted upon the strip 10 and completely covering, under normal conditions, the opening 13, is a trap door 17 which is mounted upon a transverse pivot 18 and supported in bearings of any suitable character upon the upper face of the strip 10. This trap door 17 extends inward to the wall 11 and the outer end of the trap door is preferably counterbalanced as at 19. The outer end of the trap door extends slightly beyond the opening 13 so that the counterbalance will normally support the trap door in a horizontal position but if any weight is disposed upon the inner end of the trap door, this inner end will descend causing the animal thereon to plunge into the vessel A. This trap door 17 is normally held in a horizontal position by means of a latch 20, this latch consisting of a strip of thin metal pivotally supported upon a transverse pin 21 extending across the slot 12 of the wall 11. The upper corner of the latch 20 projects through the slot 12 and is provided with a foot rest 22. The lower end of this strip 20 is provided with an inwardly projecting tooth 23 and inasmuch as the latch 20 projects outward beyond the pivot 21, this lower end 23 will be urged into engagement with the forward end of the trap door. Bait 24 is attached to the wall 11 above the foot rest 22. It will be obvious now that when the mouse stands upon the trap door and places his fore feet upon the foot rest 22 he will press the trigger 20 outward thus releasing the trap door and the trap door will tilt under the weight of the mouse and the mouse will plunge into the vessel A. As soon as the weight of the mouse has been relieved from the trap door, the counterweight 19 will cause the trap door to return to its normal position where it will again be engaged by the latch 20 and the trap is thus automatically reset while the mouse is drowned.

Attention is called to the fact that the foot rest 22 is formed integral with the latch 20 by extending the material of the latch outward and slitting it along one margin and bending this portion upward and then outward so as to form the two flanges 24 and the intermediate V-shaped folded portion 25. The strip 10, for a mouse trap, will be approximately 5" wide and 8" long but it may be made of any other suitable width or length and, of course, will be of larger size for rats and larger size still for other small animals.

I claim:—

A trapping device comprising a member adapted to rest upon a vessel containing water, said member having an opening in it and having an upstanding wall extending from one end of said opening, the opening being continued as a slot beyond said wall and the wall having a vertical slot intersecting the first named slot, a trap door tiltably mounted upon said member and normally closing said opening and urged by gravity to a closed position, a latch formed of a strip of thin metal disposed in a vertical plane and pivoted upon the wall on the inside face thereof, said latch being disposed in the vertical slot of said wall and having its lower end extending through the continuation of said opening and having its lower end formed with a detent tooth engaging beneath the free edge of the trap door, the upper end of said latch extending inward beyond the pivot and bent to form two laterally extending ears constituting foot rests, and means for supporting bait on the wall above the foot rest.

In testimony whereof I hereunto affix my signature.

EDWARD R. MARTIN.